Patented Aug. 11, 1936

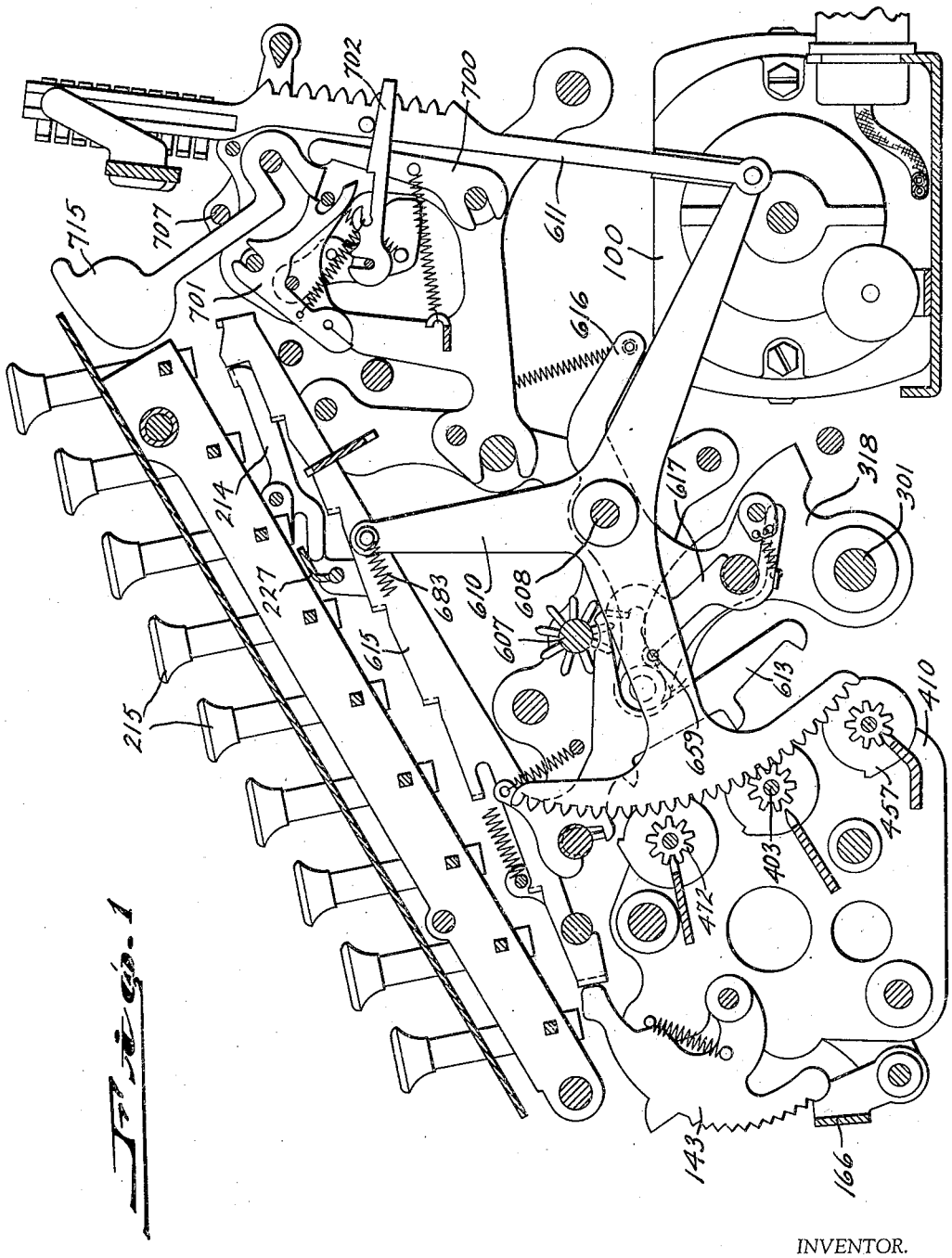

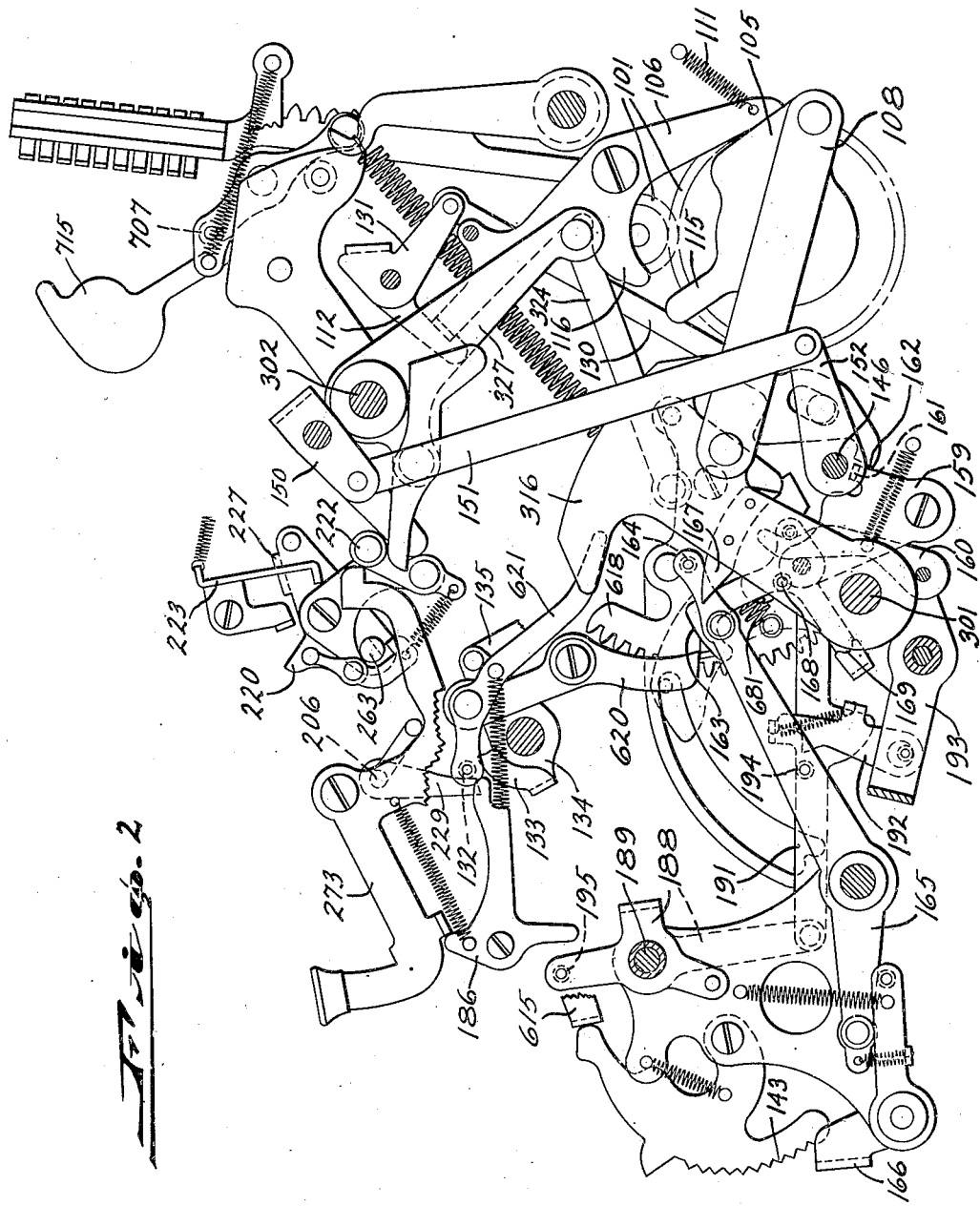

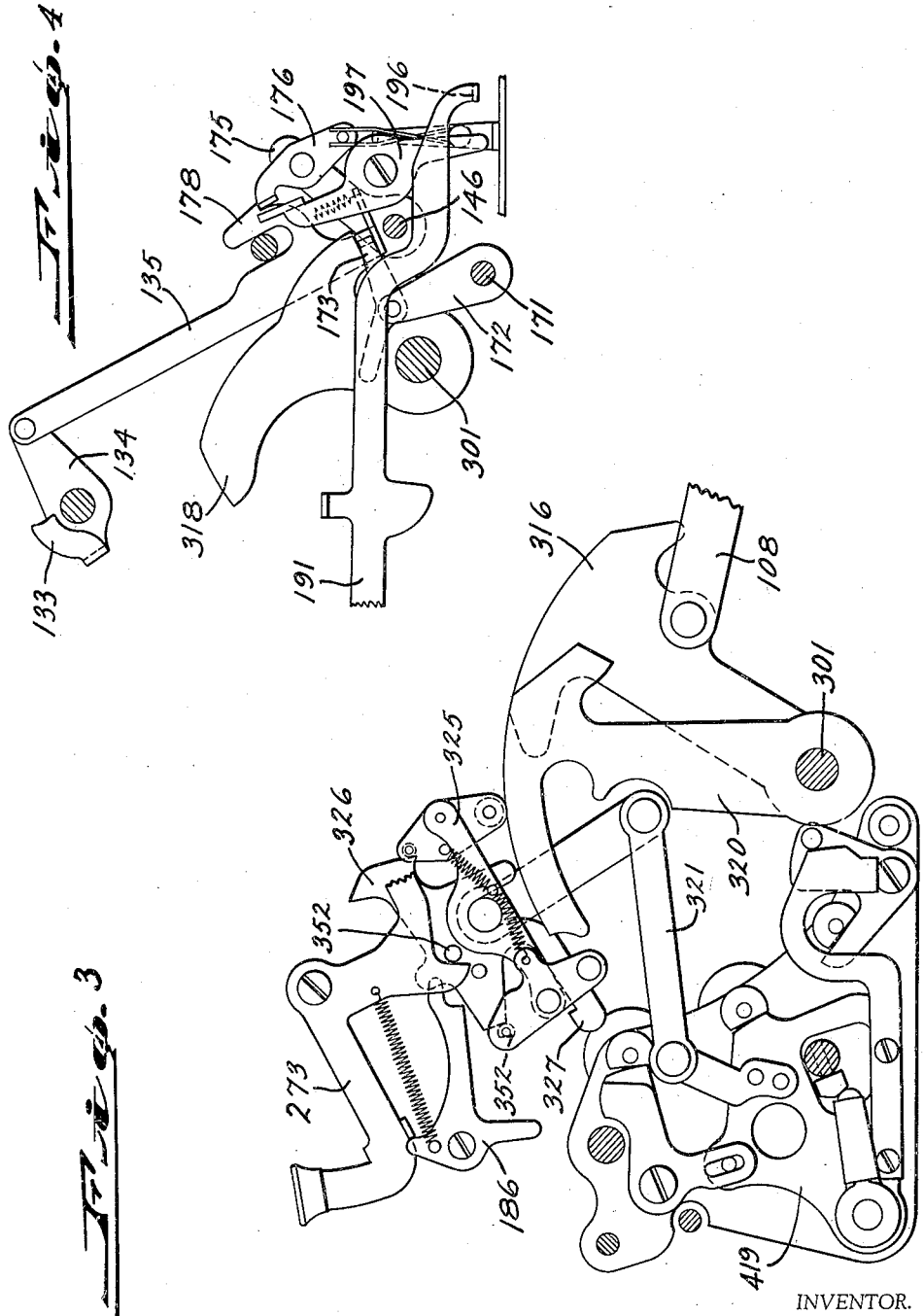

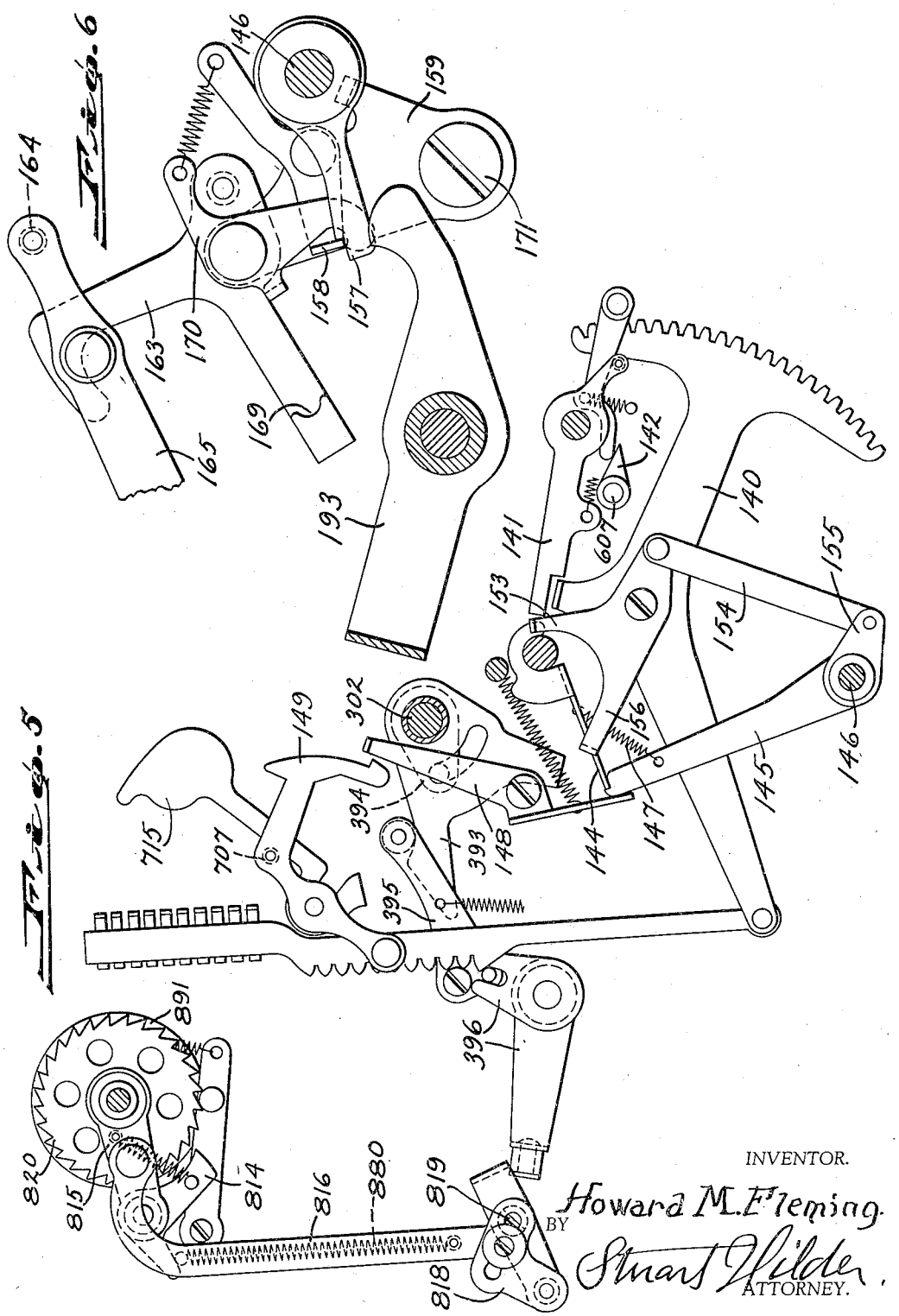

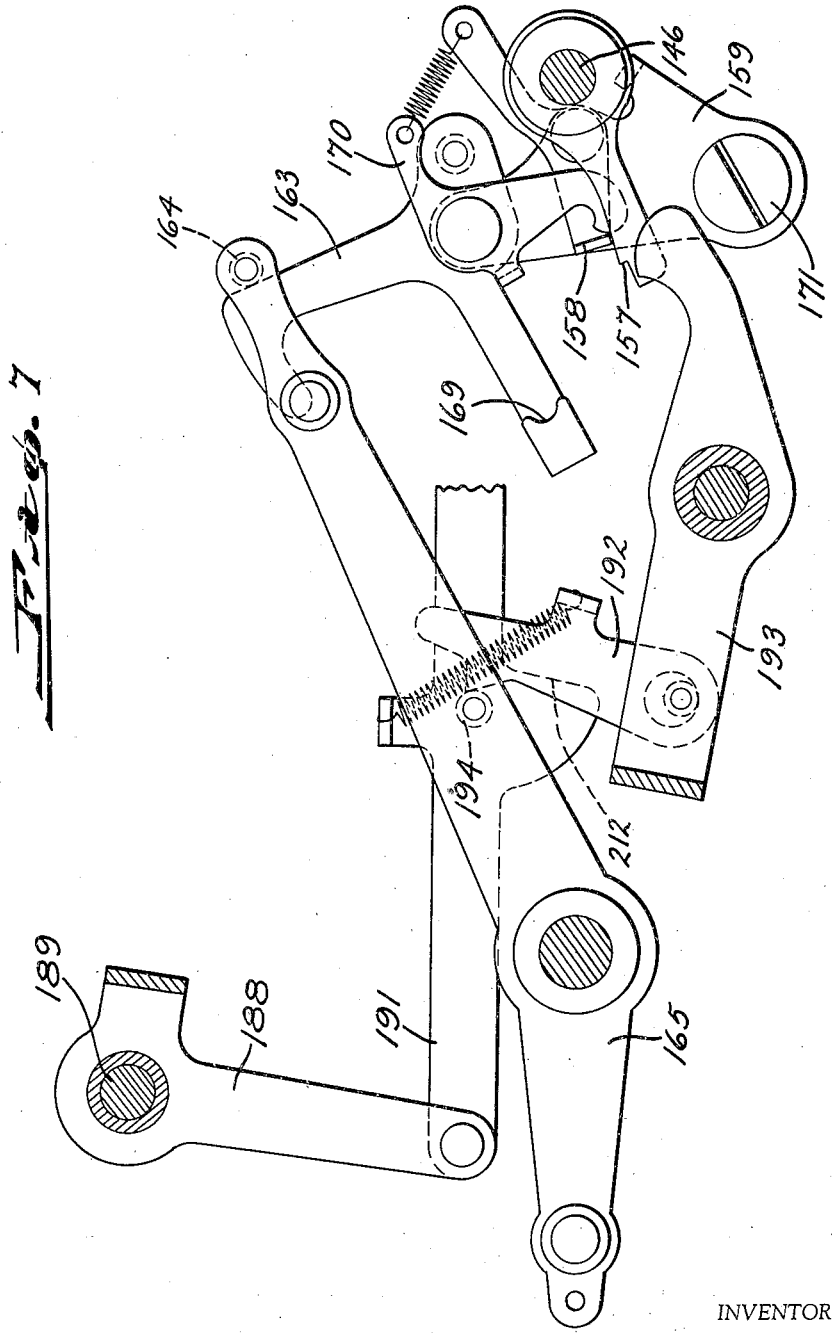

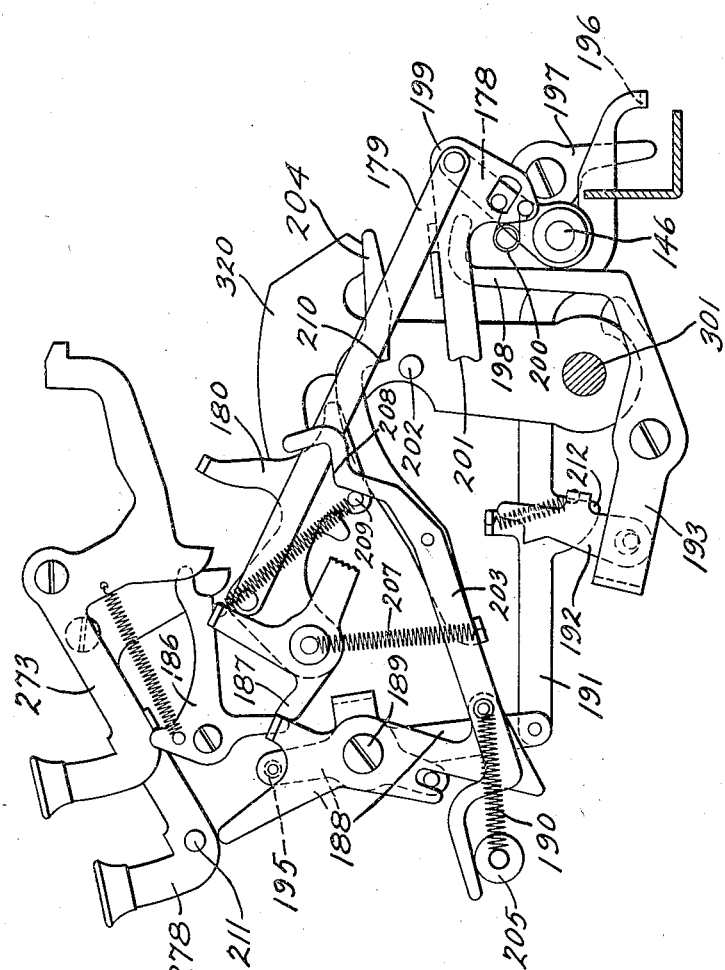

2,050,302

UNITED STATES PATENT OFFICE 2,050,302

LISTING, ADDING, AND SUBTRACTING MACHINE

Howard Moffatt Fleming, West Orange, N. J., assignor to Gardner Company, Orange, N. J., a corporation of Delaware Application December 21, 1935, Serial No. 55,605

3 Claims. (Cl. 235—60)

The invention relates to listing, adding and subtracting machines, and more particularly to means for printing true negative sub-totals.

In adding and subtracting machines totals which represent negative values commonly appear upon the register wheels as the complements of such values, so that an amount which is minus 18 would be registered as 99982, and if the total is printed, this complemental value will appear upon the slip, instead of the true negative total 18.

According to the present invention, when totals are taken, the machine operates as usual so long as the value registered is positive, but in case of a negative value, the complement will be automatically converted to the true negative total, and so displayed, the complement being restored to the accumulator.

In the present application, the invention is shown as applied to a register of the Gardner type, disclosed in its essential features in the U. S. Patents to Clyde Gardner, deceased, No. 1,828,180, issued October 30, 1931 and No. 1,867,002, issued July 12, 1932, both entitled Calculating machine.

More particularly, the invention comprises an addition to the mechanism disclosed in the U. S. Patent to Loring P. Crosman, No. 1,915,296, issued June 27, 1933, and showing means for printing a true negative total, wherein the accumulator is left at zero.

In the accompanying drawings, illustrating the invention:

Fig. 1 is a vertical section through the registering and printing mechanism of the machine to which the invention is applied.

Fig. 2 is a right side elevation of the sub-total control mechanism.

Fig. 3 is a similar views of the plus, minus controls.

Fig. 4 is a similar view of the total latch control devices.

Fig. 5 is a left side elevation of the negative total control devices.

Fig. 6 is an enlarged right side elevation of the differential stop control devices, the parts being shown in normal position.

Fig. 7 is a similar view with the parts shown in tripped position.

Fig. 8 is a right side elevation of the total and sub-total keys and associated control devices.

Addition and subtraction

For each denominational order, the machine is provided with a three-armed actuator lever, numbered 610 on the drawings, (Fig. 1), these levers being loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its related bar 615, these latches preventing movement of a stop bar and lever 610 in any column in which no key is depressed.

A rock shaft 301 is provided with cam means 318 for governing the movement of a spring tensioned rocker frame 616, mounted on shaft 608, frame 616 carrying a series of dogs 617 normally engaged by studs 659 of the levers 610. As shaft 301 is rotated forwardly, frame 616 will be rocked, and any of the levers 610 which have been released by the depression of digit keys will be allowed to rotate, under the influence of their springs 683, until they are stopped by the lugs of bar 615 contacting with the stems of the keys. Upon rearward rotation of shaft 301, the dogs 617 will return the operated levers 610 to normal position. This excursion of the levers 610 serves to register amounts set in the keyboard upon one or more accumulators and to set up a similar amount on the printing line of the type bars.

Shaft 301 is oscillated by means of an electric motor 100, connected through gearing 101 (Fig. 2) and suitable clutch means, with a crank arm 105, connected to an arm 316, fast with shaft 301, by means of a connecting rod 108, so that as crank arm 105 is rotated shaft 301 will be oscillated.

Spring 111 tends to pull lever 106 away from the clutch, the lever being normally held in engaging position by means of a latch 112.

Upon release latch 112 will return under spring action into latching position, and toward the end of the cycle of operation an arm 115 connected with the crank member 105 will contact with a tooth 116 of the clutch lever 106 and will force said lever back into latching position, bringing the end of lever 106 into the path of movement of the rotating clutch member.

The above described excursions of the levers 610 effect positive or negative registrations of values set up in the keyboard in the following manner:

The segmental racks of the levers 610 are designed to operate the accumulator wheel gears 472 (Fig. 1) of one or more accumulators. These accumulators are shown in Patent 1,867,002, as means for storing positive or negative totals, to be printed. Tens carry mechanism is provided, according to the disclosure of Patent 1,828,180.

The accumulator shafts 403 are slidably mounted in slots of frame plates 410, and when any or all of the accumulators are set to active position, the gears 472 thereof are brought into mesh with the racks of the levers 610, where they are held, against spring tension exerted on shaft 403, by a rocking cam plate 419, engaging said shaft.

Normally this cam plate is set (as in Fig. 3) to provide for additive registration, wherein the accumulator shaft 403 will be moved away from the racks of levers 610 before said racks are allowed to move, and will be moved to reengage the gears 472 while the racks lie in the extreme positions permitted by the keys 215 and stop bars 615. As shaft 301 is returned, and the racks are raised, the value set in the keyboard will be additively transferred to the register. Cam plate 419 is connected, through link 321 (Fig. 3), with a rocker 325, provided with two cam followers adjustable by a plate 326 to cooperate differentially with two cam arms, 316 and 320, on shaft 301, so that rocker 325 and cam plate 419 will be moved and the segments meshed and unmeshed with the accumulator gears at the proper times. These control devices are fully described in Patent 1,867,002, and when readjusted for subtractive operation the time at which the accumulators are shifted out of and into mesh with the segmental racks is changed, so that the accumulators remain in mesh during the first or downward stroke of the racks, and consequently register subtractively. During the upward stroke of the racks the accumulators are released from the action of the cam plate 419 and are pulled out of mesh by their springs.

*Total printing*

A total is taken by releasing the differential stop bars 615 and allowing them to rotate the accumulators subtractively until suitable pins on the accumulator wheels contact with 0 stop members. This will set the total in the type bars, and the hammers will be tripped to print the total. The bars 615 are then reengaged with the oscillating frame and during the return stroke of said frame are moved rearwardly to normal position, the accumulator wheels, in the case of a subtotal, being held in engagement with the racks during the return stroke, whereby the amount previously subtracted from the register will be added back thereinto.

The machine is set for subtractive operation by contact of the total or sub-total key lever with a related pin 352 (Fig. 3) on rocker control plate 326, said plate being moved to disable the rear cam follower of the rocker 325, to engage a hook 327 in front of a pin 352 on the forward cam follower, and to disengage plate 326 from position in rear of pin 352. Consequently, the forward cam follower will rock idly on its pivot during the forward stroke of the machine, but will be held by the hook 327 and will act to move the rocker 325 at the start of the return stroke. This provides the correct operation of the parts in taking totals, but for taking sub-totals means are provided for disabling the forward cam follower during the return stroke also, so that the accumulators are left in mesh with the racks. This means comprises a spring latch 186, normally held in inoperative position by sub-total key 273, which latch, upon depression of the sub-total key, is allowed to fall upon the pin 352. When cam arm 320, in the forward stroke of the machine, rocks the forward cam follower idly about its pivot, latch 186 will drop in front of pin 352, holding the forward cam follower free of cam arm 320 as long as the sub-total key 273 remains depressed.

Depression of the total or sub-total key will not only trip the column latches 214 (Fig. 1), through pin 263 and rocker 227, but will also trip a latch 620, through operation of a control arm 621 pivotally connected to said latch. Latch 620 normally engages a lug on total segment 618, preventing movement of said segment under the influence of the total spring 681. Upon tripping of the latch, segment 618 will operate a shaft 607 having a spirally arranged row of pins, acting to trip the latching dogs 617 successively, from right to left of the machine, the tripping of said dogs releasing the segments and also releasing stop members 613 (Fig. 1), so that they will fall into the path of the 0 stops 457 on the accumulator wheels. The successive release of the differential stop bars 615 by the latches 214 is essential because of the character of the tens transfer mechanism employed between the accumulator wheels.

When this zeroizing operation has progressed to the left hand side of the machine, a rearwardly extending arm of the total segment 618 will contact with a projection of a rod 130 (Fig. 2) connected at its other end to a trigger 131, adapted to release latch 112, to start the machine. The machine being put in operation, frame 616 will carry the dogs 617 forwardly, so that they will snap under the stop members 613 and studs 659 of the segment levers. The hammers will now be tripped, and upon rearward movement of frame 616, the segments will be restored to normal position.

The total or sub-total key is locked in depressed position, by latch 223, and is released near the end of the cycle of motor operation by engagement of a finger of arm 227 above a click pawl 222 of latch striker 220, the parts of the total setting mechanism being then restored to normal postion as follows:

In tripping the total segment latch (Fig. 2), shaft 206 is rocked, an arm 229 on said shaft contacting with a pin 132 in the latch-operating arm 621. The latch being tripped, and total segment 618 rising, the latching lug of the segment will be brought in contact with lever 621, moving pin 132 out of contact with arm 229 and into contact with a shoulder 133 of a rock plate 134, pin 132 being held against said shoulder by the latch spring. During the following motor operation of the machine, the forward movement of rocker cam 318 will release a spring tensioned push rod 135 (Fig. 4) connected with rocker plate 134, and shoulder 133 will be rotated until pin 132 comes below arm 229, restoring latch 620 and arm 229 to normal position by the action of the latch spring, as soon as the total key is released, thus concluding the totalizing operation.

The type bars 611 are provided each with a row of type, representing the digits 1 to 9 and 0, the 0 or zero type being normally on the printing line. When the levers 610 are moved in accordance with a key setting or an accumulator registration, the related type bars will be raised to bring the appropriate type to the printing lines.

The type hammers 715 (Fig. 1) are adapted to be operated by spring actuators 700, but are normally held in tensioned position by latches 701. When a type bar is lifted, a tripping finger 702 is allowed to move into engagement with the corresponding latch 701, and at the end of the forward rotation of shaft 301, a frame upon which the tripping fingers are mounted is moved forwardly, releasing the hammers from those latches which have been engaged by the fingers 702.

At the end of each registering or totalizing operation the record paper platen will be rotated by a line space mechanism (Fig. 5), operated from a shaft 302, oscillated by means of a link connection 324 (Fig. 2) between the cam arm 316 and an arm 327 of shaft 302. The forward excursion of cam arm 316, oscillating shaft 302, will move arm 394, plate 393, levers 395, 396, and 818, (fulcrumed at 819) link 816, and arm 815, allowing pawl 814 to rise through the action of spring 880, and engage with platen ratchet 820. The return movement of the parts will act to restore link 816 to normal position, advancing the platen and disengaging pawl 814.

*Negative sub-totals*

In taking a total, amounts carried up to the accumulator wheel located to the left of the keyboard are transferred to the printing devices by means of a two-armed lever 140 (Fig. 5), similar to the levers 610, but having no connections with the keyboard. This lever 140 is normally held inactive by a latch 141, which in total taking is tripped by a finger 142 on the shaft 607 controlling the successive release of the segments.

If the total is negative, the complemental registration in the accumulator will include a nine in the above-mentioned left hand wheel, and the movement of lever 140 from eight to nine printing position is utilized to set the true negative total devices in operative position.

It will be noted from the above that the first step in total taking is the same, whether such total be positive or negative, the accumulator being zeroized and the total being set up in the type bars. It will also be obvious that, owing to the "crawl" type carry mechanism, it would be impractical to determine, by the position of lever 140, or of its accumulator wheel, whether an amount standing in a given accumulator was of positive or negative character, until the total segment 618 had operated, and the type bars had been set.

The method of converting the complement of a negative total, set in the type bars, to the true negative total is as follows:

A set of stops 143 (Fig. 2), yieldably engaging the stop bars 615, are locked in position as adjusted thereby, in accordance with the complemental registration, and the segments 610 are restored idly to normal position. The segments are now again released and will be stopped by the stops 143, the accumulator being meshed during this subtractive stroke of the segments, whereby the complement is subtracted from zero, giving a registration of the true negative total. This may be illustrated by the following figures:

```
    0 0 0 0 0 0
    9 9 9 3 3 4
    -----------
    0 0 0 6 6 6
```

The racks, having been again restored idly to normal position following the subtractive operation, and the stops 143 being released, the second zeroizing operation will now transfer the true total to the stops 143, which are again locked. A final reciprocation of the racks will subtract the true total from the zeroized accumulator as follows:

```
    0 0 0 0 0 0
    0 0 0 6 6 6
    -----------
    9 9 9 3 3 4
```

Thus in the final cycle of operation of the machine the true negative total is set on the racks, and may be printed, and the complement of such true total is registered upon the accumulator, giving the desired result.

It will be noted that when the sub-total is negative the totaling operation should be similar to that in totals involving total key 278, since the accumulator is to be brought to zero in preparation for further subtractions therefrom. Means are therefore provided for disabling the latch 186, the details of such means being more conveniently set forth in connection with other mechanism to be described hereinafter.

Total segment 618 having acted, and the total being negative, the machine will operate as follows:

In moving from eight to nine printing position, lever 140 contacts with a latch plate 144 Fig. 5 and moves the same out of engagement with an arm 145 of setting shaft 146, which will thereupon be rocked, by spring 147. The rocking of shaft 146 suspends the operation of the printing and normalizing devices as follows:

A printing operation is prevented during the conversion of the complemental amount on the totalizer by means of a spring actuated arm 148 which is released by the rearward movement of arm 145 and will thereupon engage a latch 149 of the hammer restoring bail 707, latching said bail in position to prevent printing operation of the hammers 715.

The release of the sub-total key from its latch 223 (Fig. 2) is prevented by an arm 150 connected by link 151 with arm 152 of setting shaft 146, arm 150 being held in the rocked position of the shaft in engagement with pawl 222 mounted on the latch striker 220, so that said pawl may not be operated to actuate the striker so long as setting shaft 146 remains in rocked position. Sub-total key 273 thus remaining latched in operative position, the subsequent operations will all be of a subtractive nature, and the column latches 214 will remain inactive.

The latch 141 (Fig. 5), controlling the two armed lever 140 and the extreme left hand type bar, having been tripped in the total setting operation, is held out of latching position when the total is negative by a pivoted member 153, engaging beneath said latch, member 153 being connected by a link 154 with an arm 155 of setting shaft 146. Lever 140 being free from latch 141 will operate to its extreme degree of movement in the subtractive true negative total setting operation of the accumulator hereinbefore referred to, and will thereby subtract nine from the accumulator wheel with which it is engaged, whereby the subtractive carry transmitted to this wheel during this same operation will be neutralized. This arrangement is employed because of the absence of a stop bar 615 and stop 143 related to the left hand wheel.

The line spacing of platen 891 is prevented by an arm 156 of the pivoted member 153, said arm taking a position in front of the plate 393 of the line spacing mechanism and preventing the operation of such mechanism by the spring 880.

The first operation of the totaling mechanism under the influence of spring 681 has served to engage the motor clutch, for the purpose of restoring the segments, etc., and in order that a second cycle of the motor drive mechanism may be secured, in which the subtractive operation of the accumulator will occur, the clutch will be held in operative position as follows:

A latch arm 157 Fig. 6 will be carried downward by shaft 146 out of engagement with a latching pawl 158 mounted on a plate 159, pawl 158 being held upward, to permit the disengagement, by a second latching pawl 170. Plate 159 being released from the latch, will be drawn rearwardly by spring pressed member 160 (Fig. 2) and a lug 161 of plate 159 will engage lug 162 of a rod 130 (now in its lower position) connected to the trigger 131, holding this trigger out of latching engagement with the clutch lever 106.

In order to lock the segment stop members 143 in the positions assumed during the preliminary total taking, the plate 159 is provided with a pivoted extension 163 (Figs. 2 and 6) which, in the rearward movement of plate 159 is held under tension against the pin 164 mounted on one end of an intermediately fulcrumed lever 165. The consequent relative movement of plate 159 and extension 163 (into the positions illustrated in Fig. 7) will release latching pawl 158 from the restraint of the second latching pawl 170, the former pawl falling upon latch arm 157. The forward arm of lever 165 operates a locking bail 166, engaging serrations of the stops 143, the lever being normally operated by a double faced cam 167 secured to arm 316 of operating shaft 301. As arm 316 moves forward rocking bail 166 is released, by the action of cam 167, while in the rearward movement of arm 316 the cooperating roller of lever 165 will ride the upper face of cam 167, whereby the locking bail is brought into contact with the stops 143. This will be the operation of the parts during the first cycle of motor operation which restores the segments. As the rear end of lever 165 is lifted by cam 167, however, in the return movement of the parts, pin 164 will be lifted free of extension 163, and said extension will immediately move under the pin, holding locking bail 166 in engaging position, where it will remain during the subtractive stroke of the second cycle of motor operation, that is to say, while the segments move the wheels subtractively from 0 registering position to the extent allowed by the stops 143. At the end of this stroke a pin 168 in arm 316 will engage a seat 169 in extension 163 and will move plate 159 and its extension 163 forwardly, in which position the parts will be held by latching pawl 158, moving into engagement with the shoulder of latch arm 157.

The true negative total being now registered in the accumulator, the second totalizing operation occurs. The total latch is controlled to initiate this second totaling operation as follows:

It has been seen that, because of the negative condition of the accumulator, the sub-total key 10 is held in depressed position, which, ordinarily, would result in the tripping of the total latch 620 at the end of the cycle of motor operation (first cycle) which serves to restore the segment levers 610. This tripping action would occur because pin 132 in the latch-operating arm 621 (Fig. 2), held depressed by key 273 and arm 229, is contacted by shoulder 133, as rocker cam 318 restores push rod 135 to normal position, tripping latch 620.

This tripping action is delayed until the completion of the second cycle of operation of the machine by the adjustment of a member 173 (Fig. 4) pivoted upon an arm 172 of shaft 171, said member lying normally between rocker cam 318 and push rod 135. Shaft 171 is rigid with plate 159, and, as said plate moves rearwardly at the end of the first total setting operation, pivoted member 173 will be carried out of register with rocker cam 318, so that, upon the subsequent return of said cam to normal position, push rod 135 will not be operated. During the subtractive cycle of operation, however, plate 159, being restored to normal position by pin 168 and part 169, pivoted member 173 will be restored to position beneath rocker cam 318, and at the end of this cycle the push rod will rock plate 134 and trip the total latch. The total latch being tripped, the machine will repeat the operations of the first two cycles, because of a second tripping of the latch 158, which will be effected as follows:

Upon movement of negative total shaft 146 to active position an arm 178 (Fig. 8), fast to said shaft, will rock a plate 189 connected to said arm by a link 179, plate 189 moving in a counter-clockwise direction and thereby moving a latch 187, pivoted coaxially with said plate, from engagement with a lug of a rocker device 188. Rocker 188 is pivoted to the frame of the machine at 189, and is rotatable clockwise by means of a spring 190. A slide 191 is pivoted to the lower end of rocker 188, said slide having yieldable spring connection with a pawl 192, mounted upon a U-shaped lever 193. Upon release from latch 187, slide 191 will be moved forwardly, bringing the pawl 192 in contact with a pin 194 of the arm 165, as shown in Fig. 7. In this position of the parts the reciprocation of arm 165 during the first cycle of motor operation will cause an idle movement of pin 194 with relation to pawl 192, said pawl, during the lifting of arm 165 during the return stroke of the racks, escaping from the pin, so that a shoulder of the pawl is brought below said pin. During the second cycle of motor operation arm 165 is held in raised position by the extension 163 of plate 159 but, said extension being pulled away from the roller 164 of arm 165 during the second cycle of operation, as herebefore described, the third cycle of motor operation will bring cam 167 of arm 316 against the roller of arm 165, depressing the rear end of the latter arm and thereby, through pin 194 and pawl 192, operating the lever 193, one arm of said lever engaging the latch 158, so that the extension 163 is again rocked in the position illustrated in the Fig. 7. Thus extension 163 will again come to position below roller 164 and the stops 143 will again be locked, to hold the true negative total taken from the accumulator by the second totaling operation. Also the release of latch 158, during the forward stroke of the third cycle, allows plate 159 to move again toward the rear, so that lug 161 will overlie the shoulder 162 of rod 130, providing for the maintenance of the clutch in engaged position until the end of the fourth cycle of operation. The repetition of the series of operations will also bring the pin 168 into engagement with seat 169 of extension 163 during the forward stroke of the fourth cycle of operation, to relatch plate 159 and release the clutch holding means.

Rocker 188 also, by means of a pin 195 acts to engage and release the latch 186, holding it in inactive position until the end of the operation.

The means, described in Patent 1,915,296, for restoring the negative total control shaft 146 during operations controlled by the total key 278, is disabled during the taking of a true negative sub-total, by means of a lug 196 (Fig. 4) of the slide 191 acting, upon setting of the slide in its forward position, to rock a dog 197. Dog 197 when held in its rocked position contacts and serves to hold a latching pawl 176 mounted on an arm 175 of shaft 146 out of contact with a shoulder 178 of rod 135, so that downward movement of rod 135 will not restore shaft 146 to its inactive position.

Shaft 146 is restored, in negative sub-total operations, as follows:

It has been said that the U-shaped lever 193 is rocked counterclockwise as viewed in Fig. 8 during the forward stroke of the racks in the third cycle of operation. This movement brings an arm 198 of lever 193 into contact with a finger 199 pivotally supported from the arm 178 of shaft 146. Finger 199 is also connected with arm 178 by means of a spring 200, the ends of the spring being so secured as to have a toggle action serving to hold finger 199 yieldably in raised or lowered position. Finger 199, being moved to its raised position by an arm 198 of lever 193, a seat 201 in the end of said finger will be brought into the path of movement of a pin 202, secured in the cam arm 320. Upon the return stroke of the racks, during the third cycle of operation, pin 202 will engage seat 201 and rock arm 178 and shaft 146 in a clockwise direction as viewed in Fig. 8, counterclockwise as viewed in Fig. 5, to reengage the arm 145 with the latch 144 and secure the shaft 146 and its associated parts in inactive position. This restoration of shaft 146 also serves, through the action of arm 145 on latch 148 to release the hammers 117, so that during the next or fourth cycle of operation they will act to print, upon the record sheet, the true negative total, set in the racks 610.

Shaft 146 having been restored to inactive position in the latter part of the third cycle of operation, the means, 150, etc., (Fig. 2) for preventing the release of sub-total key 273 from its latch 223, will be retracted, so that at the end of the fourth cycle the key will be unlatched by the action of the arm 327, as hereinbefore described. Therefore at the end of the fourth cycle, pin 132 of latch arm 621 will be moved upward, away from shoulder 133 of plate 134, and the succeeding movement of rod 135 will not trip the total latch 620, and the operation of the machine will be concluded.

Slide 191 (Fig. 8) is restored to normal position as follows:

An arm 203 is pivoted to the rocker 188 and is provided with a pivotal extension 204, these parts being guided by contact of arm 203 with a fixed roller 205, and by the action of a spring 207 attached to the extension 204. The rear end of arm 203 is provided with a tooth 208, engaging a pin 209 fixed in the plate 180. The setting of shaft 146, arm 178 and plate 180 into negative total position, together with the forward movement of arm 203 caused by the action of spring 190 on rocker 188, will serve to locate the pin 209 at the extreme upper end of the tooth 208. Upon restoration of shaft 146 and plate 180, pin 209 will be moved downward, against the upper face of tooth 208, depressing the rear end of arm 203 and bringing a shoulder 210 of extension 204 into the path of movement of pin 202 of the cam arm 320. Thus the return stroke of arm 320 will pull extension 204, arm 203, rocker 188 and slide 191 into normal position, at the extreme end of the fourth cycle of operation, a shoulder 212 of slide 191 restoring pawl 192 from position beneath pin 194, in which position the parts will be held by the latch 187.

This restoration of rocker 188 serves also to remove pin 195 from latch 186, so that the sub-total key 273 may act in its normal manner in the taking of positive sub-totals.

In order that the total key 278 may control the operation in the manner described in Patent No. 1,915,296, during negative total operations, a pin 211 in the total key lever (Fig. 8) is engageable with an extension of the rocker 188, to hold the negative sub-total parts inactive.

I claim:

1. In a listing adding and subtracting machine having an accumulator adapted to accumulate positive or negative totals, total printing devices, and means for converting an accumulated complement of a negative total into a true negative total and registering same on the accumulator including stop devices; means controlling operation of the negative total converting means to zeroize the accumulator and transfer said true negative total to and hold it in the stop devices, and means controlling further operation of the negative total converting means to subtract the true negative total held in the stop devices from the zeroized accumulator and set the same in the printing devices, whereby the complement of the negative total will be registered and the true negative total printed.

2. In a listing adding and subtracting machine having an accumulator adapted to accumulate positive or negative totals, total printing devices including a total key and a sub-total key, means including stop devices controlled by said total devices upon operation of the total key or alternatively of the sub-total key for converting an accumulated negative total into a true negative total and for zeroizing the accumulator; means adapted to be disabled by the total key and adapted to cooperate with the zeroizing means to transfer said true negative total to and hold it in the stop devices while zeroizing the accumulator, and means for subtracting the true negative total held in the stop devices from the zeroized accumulator and for setting the same in the printing devices, whereby the complement of the negative total will be registered and the true negative total printed.

3. In a listing adding and subtracting machine having an accumulator, total printing devices, and sub-total key devices adapted to add back into said accumulator a total subtracted therefrom; means controlled by the printing devices in accordance with a complemental registration on said accumulator including means for disabling the adding back action of said sub-total key devices, means including stop devices for converting a complemental registration into a true negative total and registering same on the accumulator, means controlling operation of the converting means to zeroize the accumulator and transfer the true negative total to and hold it in the stop devices, and means controlling further operation of the converting means to subtract the total held in the stop devices from the zeroized accumulator and to set the same in the printing devices, whereby the complement of the negative total will be registered and the true negative total printed.

HOWARD MOFFATT FLEMING.